(12) United States Patent
Haaland

(10) Patent No.: US 9,370,765 B2
(45) Date of Patent: Jun. 21, 2016

(54) SPACE-FILLING POLYHEDRAL SORBENTS

(71) Applicant: BlackPak, Inc., San Francisco, CA (US)

(72) Inventor: Peter Haaland, Fraser, CO (US)

(73) Assignee: BLACKPAK, INC., San Francisco, CA (US)

( * ) Notice: Subject to any disclaimer, the term of this patent is extended or adjusted under 35 U.S.C. 154(b) by 115 days.

(21) Appl. No.: 14/506,405

(22) Filed: Oct. 3, 2014

(65) Prior Publication Data

US 2016/0096164 A1    Apr. 7, 2016

(51) Int. Cl.

| | |
|---|---|
| *B01D 53/04* | (2006.01) |
| *B01J 20/28* | (2006.01) |
| *B01J 20/16* | (2006.01) |
| *B01J 20/12* | (2006.01) |
| *B01J 20/22* | (2006.01) |
| *B01D 53/02* | (2006.01) |
| *F17C 11/00* | (2006.01) |
| *F17C 13/04* | (2006.01) |

(52) U.S. Cl.
CPC ........... *B01J 20/28042* (2013.01); *B01D 53/02* (2013.01); *B01J 20/12* (2013.01); *B01J 20/16* (2013.01); *B01J 20/226* (2013.01); *F17C 11/005* (2013.01); *F17C 11/007* (2013.01); *F17C 13/04* (2013.01); *B01D 2256/16* (2013.01); *B01D 2256/24* (2013.01); *Y10T 428/2982* (2015.01)

(58) Field of Classification Search
CPC ...... B01J 20/28042; B01J 20/12; B01J 20/16; B01J 20/226; B01D 53/02; B01D 2256/16; B01D 2256/24; F17C 11/005; F17C 11/007; F17C 13/04; Y10T 428/2982

USPC .......................................................... 428/402
See application file for complete search history.

(56) References Cited

U.S. PATENT DOCUMENTS

| | | | | |
|---|---|---|---|---|
| 6,146,446 | A | * | 11/2000 | Tuma .................. G11B 33/146 55/385.1 |
| 2005/0169825 | A1 | | 8/2005 | Cadours et al. |
| 2005/0169826 | A1 | * | 8/2005 | Li ...................... B01D 53/9431 423/244.06 |
| 2009/0298382 | A1 | * | 12/2009 | Ochi .................... A63H 33/086 446/121 |

FOREIGN PATENT DOCUMENTS

| | | | |
|---|---|---|---|
| WO | 2014055546 | | 4/2014 |
| WO | WO2014/055546 | * | 4/2014 |

OTHER PUBLICATIONS

Written Opinion of the International Searching Authority for Application No. PCT/US2015/052393 dated Dec. 18, 2015 (3 pages).
Search Report of the International Searching Authority for Application No. PCT/US2015/052393 dated Dec. 18, 2015 (9 pages).
O. de Laat, F.M. de Oliveira Filho, and F. Vallentin, "Upper Bounds for Packings of Spheres of Several Radii", arXiv:1206.2608v1, Jun. 12, 2012.

* cited by examiner

*Primary Examiner* — Leszek Kiliman
(74) *Attorney, Agent, or Firm* — Michael Best & Friedrich LLP

(57) ABSTRACT

Solid sorbents, systems, and methods for pumping, storage, and purification of gases are disclosed. They derive from the dynamics of porous and free convection for specific gas/sorbent combinations and use space filling polyhedral microliths with facial aplanarities to produce sorbent arrays with interpenetrating interstitial manifolds of voids.

20 Claims, 10 Drawing Sheets

US 9,370,765 B2

SPACE-FILLING POLYHEDRAL SORBENTS

STATEMENT OF GOVERNMENT INTEREST

This invention was made with government support under Contract No. DE-AR0000462, awarded by the U.S. Department of Energy. The government has certain rights in the invention.

TECHNICAL FIELD

The present disclosure relates generally to solid sorbents, systems, and methods for pumping, storage, and purification of gases.

BACKGROUND

Sorbent materials are widely used for the pumping, storage, and purification of gases and gas mixtures and as elements of refrigeration systems. These solid sorbent materials are contained in a pressure vessel that includes one or more apertures through which gas is added or removed, and free space or ullage. Since the quantity of adsorbed gas is proportional to the amount of sorbent, storage capacity is maximized when the sorbent completely fills the vessel and the ullage is zero. However, gas flow into and out of porous materials is slower than free convection through the ullage, so tanks without ullage may not provide adequate uptake and discharge rates for specific applications.

Transport of gas into and out of the sorbent couples flow through the apertures and ullage by free convection to flow through the sorbent by porous convection. The former is described by the Navier-Stokes equations of fluid dynamics, while the latter is described by D'Arcy's equation and its variants. Convection, which is driven by pressure gradients, is always faster through free space than through porous media for the same geometry and pressure drop.

The total rate of gas flow into or out of the sorbent is proportional the surface area that is exposed to ullage, while the total capacity is proportional the sorbent's volume. A standard method for increasing the surface area, S, in a fixed total volume, V, is to pack the pressure vessel with spherical particles whose surface area to volume ratio is inversely proportional to the particle radius r:

$$\frac{S}{V} = \frac{3}{r}.$$

A problem with this approach of using powders or granules is revealed by Kepler's conjecture, which states that the maximum packing density for monodisperse spheres is $$\frac{\pi}{\sqrt{18}} \sim 0.74.$$

Choosing spherical particles with two discrete but different radii increases i the maximum achievable packing density to 0.82, [D. de Laat, F. M. de Oliveira Filho, and F. Vallentin, "Upper Bounds for Packings of Spheres of Several Radii", arXiv:1206.2608v1, 12 Jun. 2012] but complicates fabrication of a sorbent array because ordered placement of spheres with different diameters is required to achieve this maximum. There exists a need for improved sorbents, systems, and methods of storing, pumping, and purifying gases.

SUMMARY

The present disclosure provides sorbents, systems, and methods useful for storing, pumping, and purifying gases. The disclosed sorbents, systems, and methods provide for balancing gas phase and porous transport in sorbent media. The disclosed systems and methods use sorbent microliths whose shapes are based on space filling polyhedra with reproducible aplanarities that facilitate control of the volume and geometry of the free interstitial spaces.

In one aspect, disclosed are methods of shaping and packing solid sorbent material in a pressure vessel to achieve maximum storage capacity subject to constraints imposed by rates of charging and discharging gas from the vessel. In another aspect, disclosed are systems for adsorbing or desorbing gas, the system comprising: a pressure vessel with one or more apertures, a plurality of space-filling polyhedral-shaped sorbent materials with aplanarities on each face that, when packed in an ordered array, define an interstitial free volume whose dimensions and shape are selected to accommodate a desired rate of charging or discharging gas from the system. In another aspect, disclosed is a method of manufacturing a solid sorbent material whose storage capacity is maximized subject to constraints imposed by rates of charging and discharging a vessel containing the sorbent.

DETAILED DESCRIPTION

Disclosed are systems and methods for arranging solid sorbent materials in a tank to maximize the storage capacity of adsorbed gas subject to constraints on the rates of charging and discharging it. The present disclosure addresses the fundamental mismatch between gas flow through free spaces and through porous media using the geometry of the sorbent to optimize the sorbent capacity subject to constraints imposed by discharge and filling rates. The disclosed systems and methods use close-packed arrays of sorbent microliths. The microliths have shapes based on space filling polyhedra with reproducible aplanarities that facilitate control of the volume and geometry of the free interstitial spaces.

The disclosed systems and methods provide several advantages. Without aplanarities there is no manifold of free space between microliths, so the rate of gas uptake or discharge is proportional to the exterior surface area where the ullage and sorbent are in contact. The packing density, here defined as the fraction of available volume occupied by the sorbent, is one, and the storage capacity is therefore maximal. For any particular geometry of the sorbent and a defined exhaust or fill pressure there is an optimum modulation depth of the aplanarity at which the flow rate from the tank switches from being limited by free convection through the manifold to being limited by porous convection through the sorbent. The disclosed systems and methods provide sorbent materials that include an interpenetrating, interstitial manifold of free spaces. The modulation depth of the aplanarity is chosen to balance porous convention through the sorbent to free convention rates through the interstitial manifold, resulting in maximal capacity subject to constraints on achievable flow rates.

Figure 4:
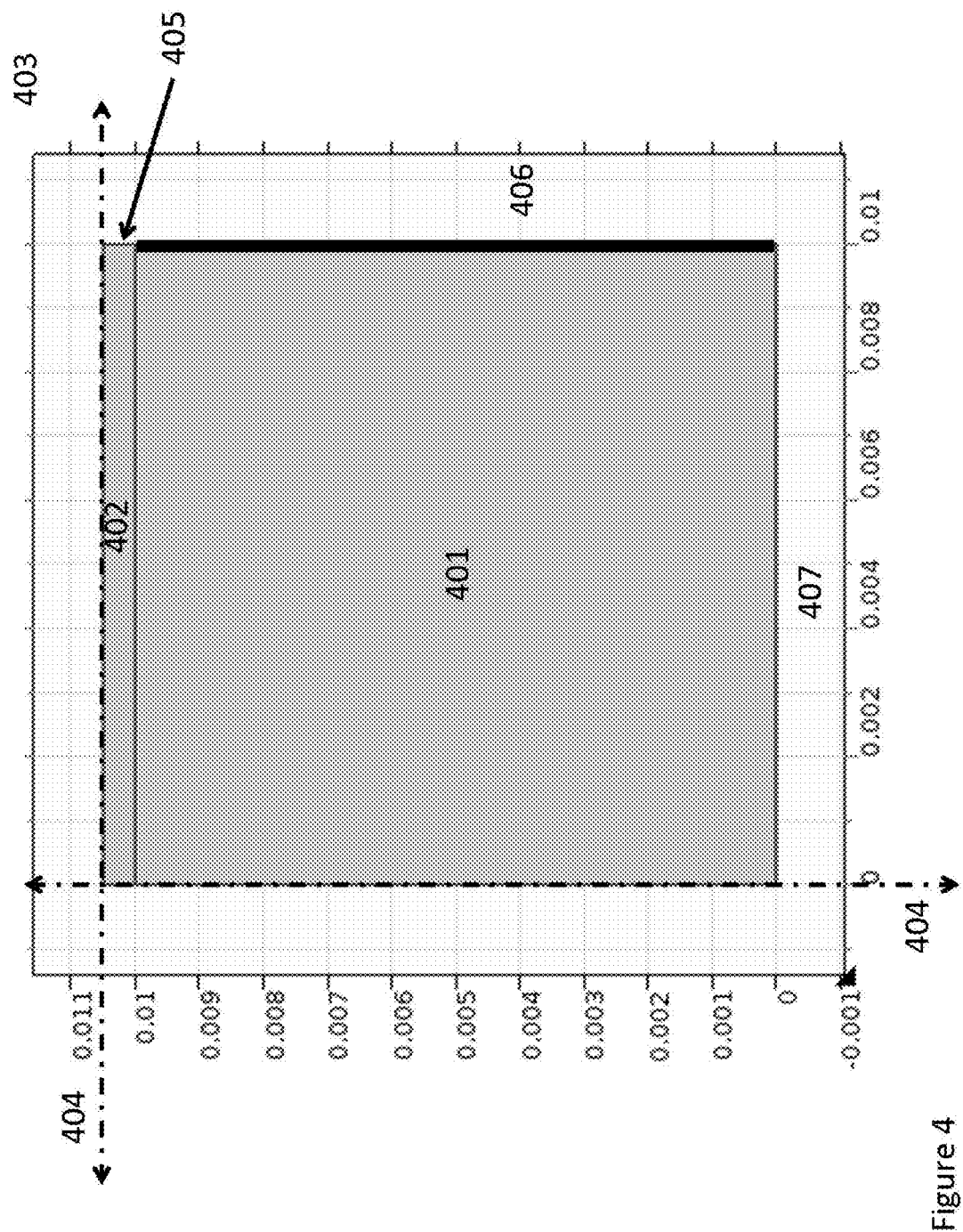
FIG. 4 is a cross-section of a sorbent microlith with symmetry axes and a variable gap forming a manifold of free space.
Figure 5:
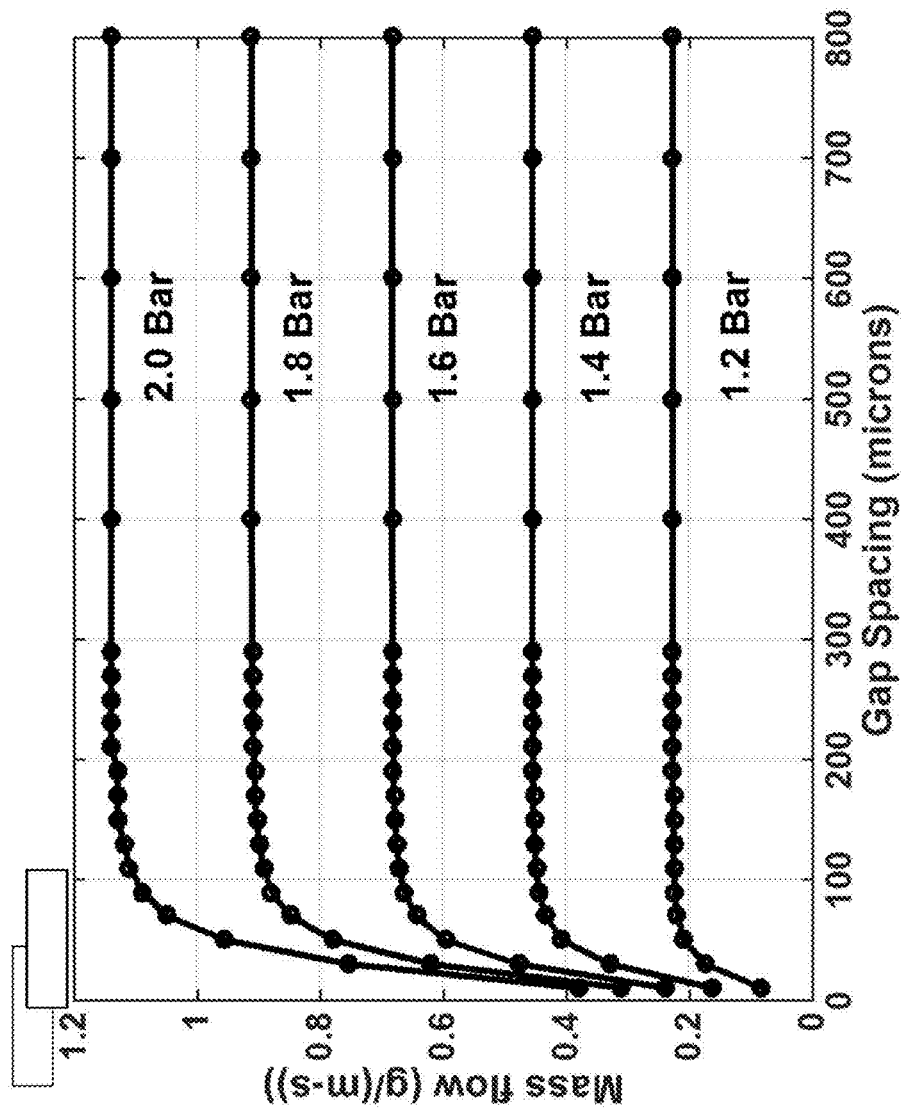
FIG. 5 is a plot of methane mass flow rate through the microlith of FIG. 4 as a function of gap spacing and pressure at the entrance to the sorbent.

The coupled equations for porous and free convective flow can be solved using standard finite element methods. FIG. 4 displays a cross-section of a sorbent (401) with a gap (402) produced by an aplanarity (not shown). Gas enters the porous medium (401) from the bottom surface (407) at a pressure $P_1$ and flows through the sorbent a free-space slot (402) and then through the exit (405) whose pressure $P_2$ differs from $P_1$. The fluid equations for free and porous transport were solved parametrically using a Comsol finite element software package (Comsol Multiphysics version 4.4, www.comsol.com) for $P_1=\{1.2, 1.4, 1.6, 1.8, \text{and } 2 \text{ Bar}\}$, $P_2=1$ Bar, room temperature methane gas, sorbent porosity=0.5, sorbent permeability=$10^{-13}$ m$^2$ and various gap dimensions. The lines (404) define symmetry planes, so that the calculation represents a cross-section of two parallel blocks of sorbent, each 1 cm thick and 2 cm wide, separated by a gap that varies from 10 to 800 microns. Referring to FIG. 5, the total flow through this exemplar system increases with gap size until the gap spacing exceeds about 100 microns, or ~1% of the edge length. The precise gap spacing corresponding to the transition from manifold-dominated free convection to sorbent-dominated porous convection will vary systematically with the gas composition, gas pressure, sorbent and manifold geometries, and porous matrix properties as computed using the methods of the present disclosure.

Figure 6:
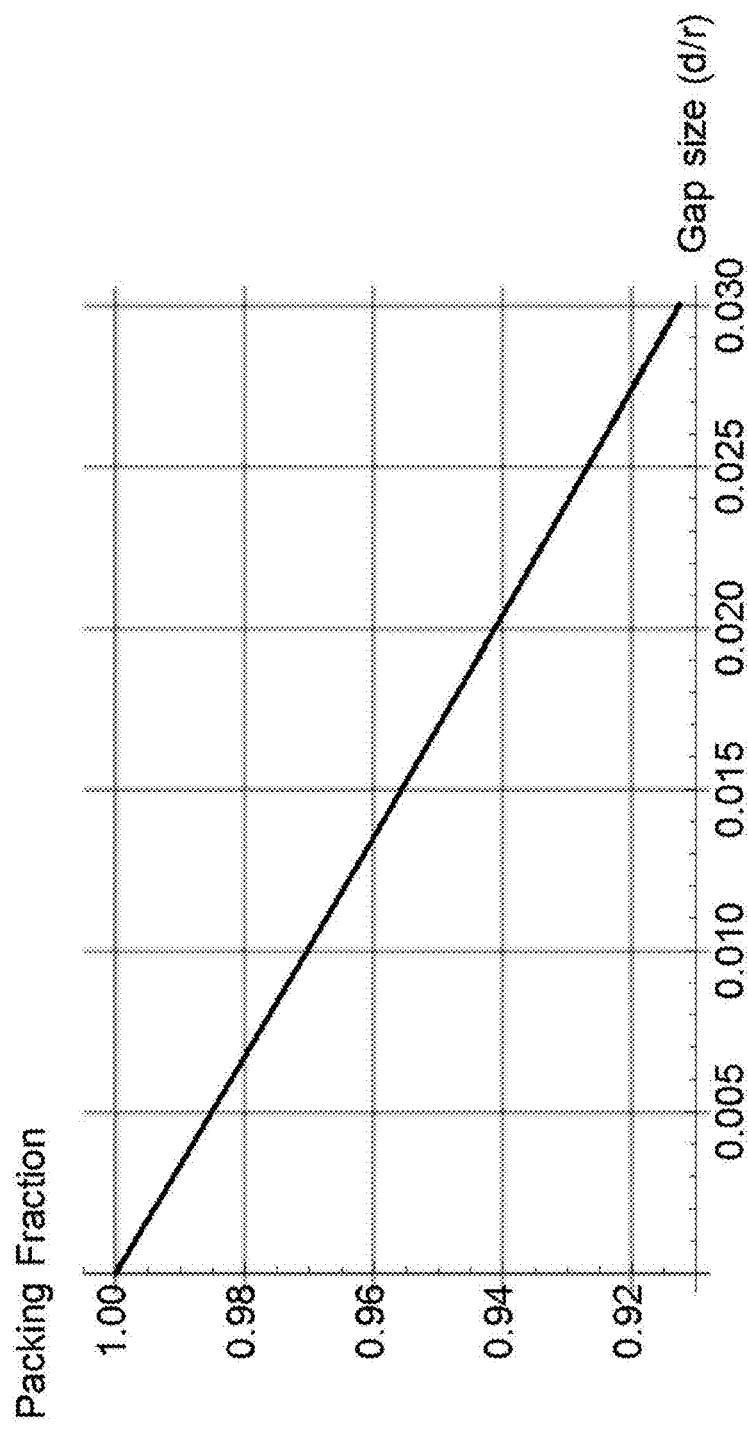
FIG. 6 is a plot of packing fraction as a function of the gap size in units of polyhedral edge length r for regular space-filling polyhedra.
Figure 7:
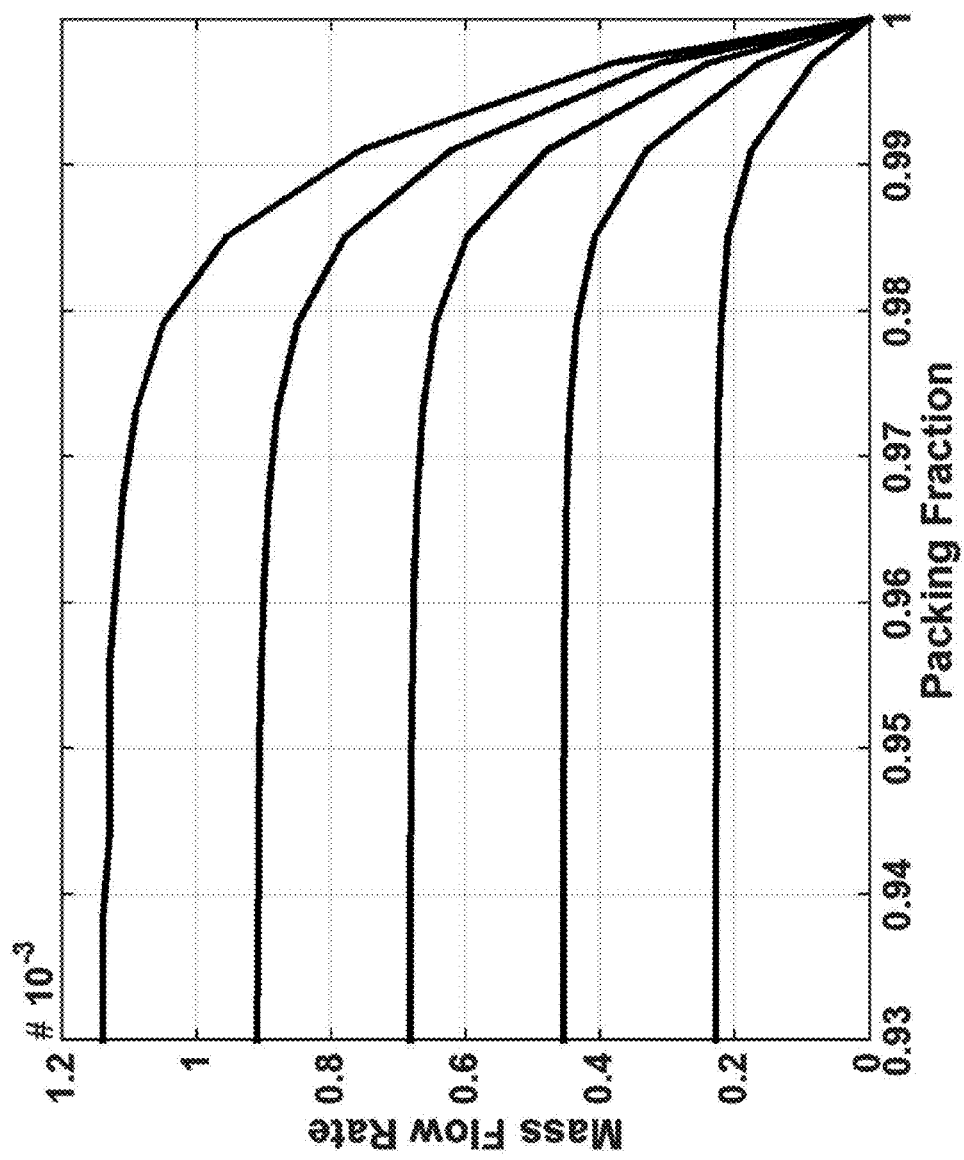
FIG. 7 combines the data from FIGS. 5 and 6 to show the relationship between packing fraction and mass flow rate as saturating according to the present disclosure.

The packing density of regular polyhedra with a gap d measured in units of the edge length r is $(1-d)^3$, with a smaller factor attributable to the aplanarities that mechanically enforce the gap. In the preceding example the gap where porous convection becomes rate limiting has d/r=1.012, implying a packing density of 0.9644, a value that is substantially greater than is possible using spherical solids. Further increase of the gap space would continue to decrease the packing density as seen in FIG. 6, but with no change to the maximum flow rates shown in FIG. 4. Referring to FIG. 7, for each pressure drop there is a packing fraction below which the mass flow rate does not rise.

The packing density for a microlith array is controlled primarily by the edge length(s) of the polyhedra and the space-filling polyhedral geometry. The packing density is modified slightly by the aplanarity's volume, and the addressable surface is modified slightly by its surface area.

1. Definition of Terms

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present invention. All publications, patent applications, patents and other references mentioned herein are incorporated by reference in their entirety. The materials, methods, and examples disclosed herein are illustrative only and not intended to be limiting.

The terms "comprise(s)," "include(s)," "having," "has," "can," "contain(s)," and variants thereof, as used herein, are intended to be open-ended transitional phrases, terms, or words that do not preclude the possibility of additional acts or structures. The singular forms "a," "an" and "the" include plural references unless the context clearly dictates otherwise. The present disclosure also contemplates other embodiments "comprising," "consisting of" and "consisting essentially of," the embodiments or elements presented herein, whether explicitly set forth or not.

The conjunctive term "or" includes any and all combinations of one or more listed elements associated by the conjunctive term. For example, the phrase "an apparatus comprising A or B" may refer to an apparatus including A where B is not present, an apparatus including B where A is not present, or an apparatus where both A and B are present. The phrases "at least one of A, B, . . . and N" or "at least one of A, B, . . . N, or combinations thereof" are defined in the broadest sense to mean one or more elements selected from the group comprising A, B, . . . and N, that is to say, any combination of one or more of the elements A, B, . . . or N including any one element alone or in combination with one or more of the other elements which may also include, in combination, additional elements not listed.

The terms "first," "second," "third," and the like, as used herein, do not denote any order, quantity, or importance, but rather are used to distinguish one element from another.

The term "storage capacity," as used herein, means the amount of stored gas in standard liters divided by the vessel volume in liters.

The term "standard liter," as used herein, refers to the amount of gas contained in one liter at a pressure of 1 atmosphere and a temperature of 0° C.

The term "sorbent," as used herein, means a permeable material that weakly and reversibly binds gas whose surface area provides a storage capacity greater than one.

The term "natural gas," as used herein, means a mixture of gases primarily comprised of methane with minor constituents including heavier hydrocarbons, water, carbon dioxide, and trace materials such the sulfur bearing molecules used as odorants.

The term "permeability", as used herein, means a measured relationship between the pressure gradient within a porous medium and the volumetric flow rate of a gas through the same medium.

The term "viscosity", as used herein, means the kinematic viscosity of a gas at the temperature(s) and pressure(s) appropriate to operation of the sorption system.

The term "microlith", as used herein, means a substantially homogeneous solid sorbent material whose shape is based on a space-filling polyhedron with facial aplanarities that produce an interpenetrating, interstitial manifold through which gas may flow when an ensemble of them are arrayed in a close-packed configuration.

The term "monolith", as used herein, refers to an ordered array of microliths with a manifold of interpenetrating, interconnected voids.

The term "ullage", as used herein, refers to space bounded by a pressure vessel and in direct fluid communication with solid sorbent.

The term "regular", as used herein, refers to polyhedral shapes whose edge lengths are all equal.

The term "irregular", as used herein, refers to polyhedra whose edge lengths are unequal.

The term "substantially", as used herein, represents the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

The term "source of gas," as used herein, may refer to, for example, a natural gas residential or industrial pipeline, a liquified gas reservoir, a tank or cylinder of compressed gas, or a gas generator.

The term "sorption isotherm," as used herein, means a measured relationship between the quantity (mass or number of moles) of adsorbed gas bound to a sorbent as a function of gas pressure at equilibrium and at a specified temperature.

2. Systems for the Storage, Pumping, or Separation of Gases

In one aspect, disclosed are systems for the storage, pumping, or separation of gases. The systems can include one or more sorbent monoliths, one or more sorbent microliths, or a combination thereof, disposed in a pressure vessel or envelope. The disclosed systems can include one or more apertures configured for transfer of gas to or from the pressure vessel or envelope.

The sorbent monoliths can be comprised of a plurality of the sorbent microliths (e.g., a plurality of sorbent microliths can form an ordered array to provide a sorbent monolith). The sorbent microliths can be provided as space-filling polyhedra that include one or more aplanar faces. The ordered array of microliths, via their facial aplanarties, can create a manifold of interpenetrating, interconnecting voids through which gas can flow.

a. Sorbent Monoliths

The sorbent monoliths of the present disclosure can be comprised of an ordered array of sorbent microliths, as described herein. The microliths can each include one or more facial aplanarities. The ordered array of microliths, via their facial aplanarties, can create a manifold of interpenetrating, interconnecting voids through which gas can flow.

Monoliths occupy volumes that are the union of that defined by an ensemble of microliths and the interpenetrating, interstitial manifolds of free spaces formed thereby. Monoliths efficiently fill volumes with complex shapes such as the toroidal pocket where a spare automotive tire is stored or the space between the exterior and interior side panels of an automobile. The dimensions of a monolith are limited only by the availability of a suitable number of microliths. The surface area to volume ratio of the monolith is defined by the geometry and edge length of the microliths and is therefore independent of the monolith's overall dimensions.

The sorbent capacity of a monolith is the product of the number and sorbent capacity of microliths plus the inherent capacity of free volume defined by the interstitial manifold.

The sorbent monoliths can be fabricated by a variety of methods.

In certain embodiments, the sorbent monoliths are formed prior to or concurrent with being disposed in a pressure vessel or envelope. For example, an array of microliths with facial aplanarities can be generated by stacking, and then a containment vessel can be built around the stack (e.g., by injection molding, composite winding, or mechanical assembly) to produce a system according to the present disclosure. Such embodiments may employ a sacrificial material such as a polymeric film to retain the shape and integrity of the array during fabrication of the surrounding pressure vessel. This material may optionally be removed by pyrolysis, dissolution, chemical reaction, or vacuum sublimation.

In certain embodiments, the sorbent monoliths are a formed directly in the free space of a pressure vessel or envelope. In certain embodiments, the pressure vessel can have an interior surface whose texture provides an internal template to facilitate self-assembly of an ordered array of microliths. In certain embodiments, the pressure vessel may optionally be agitated to facilitate self-assembly of an ordered array of microliths including an interpenetrating manifold of interstitial spaces. In certain embodiments, microliths can be admitted to a pressure vessel in a liquid whose density and viscosity are chosen to facilitate self-assembly of the suspended microliths into an ordered array. Suitable liquids include, but are not limited to, water, volatile organic fluids, fluorocarbons, and liquefied carbon dioxide. Once the array is formed, the liquid can be drained or pumped from the pressure vessel, leaving a system according to the present disclosure.

b. Sorbent Microliths

The sorbent microliths of the present disclosure can be space-filling polyhedra that include one or more facial aplanarities. The microliths can be useful for the fabrication or formation of sorbent monoliths as described herein, which can be used for the storage, pumping, or separation of gases. An array of the microliths arranged in a close-packed configuration can provide an interpenetrating, interstitial manifold through which gas can flow by virtue of the facial aplanarities. The packing density of the sorbent microliths, defined as the fraction of available space occupied by solid material, can be greater than 0.74, and preferably greater than 0.82.

The sorbent microliths can have a variety of shapes and dimensions. The microliths can be provided as regular polyhedra, irregular polyhedra, or a combination thereof. The disclosed systems can be based on space-filling polyhedra whose edges have equal lengths. Suitable regular shaped space-filling polyhedra include, but are not limited to, an acute golden rhombohedron, a cube, an elongated dodecahedron, an Escher's solid, a gyrobifastigium, an obtuse golden rhombohedron, a trigonal prism, a hexagonal prism, a rhombic dodecahedron, a squashed dodecahedron, and a truncated octahedron. The disclosed systems can also be based on space-filling polyhedra whose edges have unequal lengths. These irregular space-filling polyhedra have a packing density of one in the absence of the aplanarities that provide an interpenetrating, interstitial manifold according to the present disclosure. Suitable irregular shaped space-filling polyhedra include, but are not limited to, elongated or squashed hexagonal and trigonal prisms, rectangular parallelopipeds, and polyhedra formed by stretching or shearing the regular space-filling solids. Irregular space-filling solid microliths have reduced symmetry from their regular counterparts, so their assembly into a space-filling array is more constrained. However, auxiliary requirements based on molding or fabrication constraints, structural strength, heat transfer characteristics, and conformability with the pressure vessel may offset the complexity of assembling an array of irregular-shaped microliths.

Microliths may be prepared from suitable precursors by compression, pyrolysis, injection molding, chemical etching, or plasma processing. The creation of surfaces suitable for sorption may occur before or after forming the sorbent into an appropriate shape according to the present invention. Non-limiting examples of suitable sorbent materials or precursors include organic polymers, zeolites, metal-organic frameworks, carbons, and metal alloys.

Although microliths may in principal have any size, the preferred edge dimensions range from about one to about one hundred millimeters. In certain embodiments, a microlith may have edge lengths of 1 mm to 100 mm, 1 mm to 75 mm, 1 mm to 50 mm, 1 mm to 25 mm, 1 mm to 10 mm, 10 mm to 100 mm, 25 mm to 100 mm, 50 mm to 100 mm, 75 mm to 100 mm, or 90 mm to 100 mm. In certain embodiments, a microlith may have edge lengths of about 1 mm, about 5 mm, about 10 mm, about 15 mm, about 20 mm, about 25 mm, about 30 mm, about 35 mm, about 40 mm, about 45 mm, about 50 mm, about 55 mm, about 60 mm, about 65 mm, about 70 mm, about 75 mm, about 80 mm, about 85 mm, about 90 mm, about 95 mm, or about 100 mm. The surface area to volume ratio for a particular shape can thereby be tuned by a factor of about one hundred, with an additional factor of about five based on the specific polyhedra chosen as the basis of the microliths.

Figure 8:
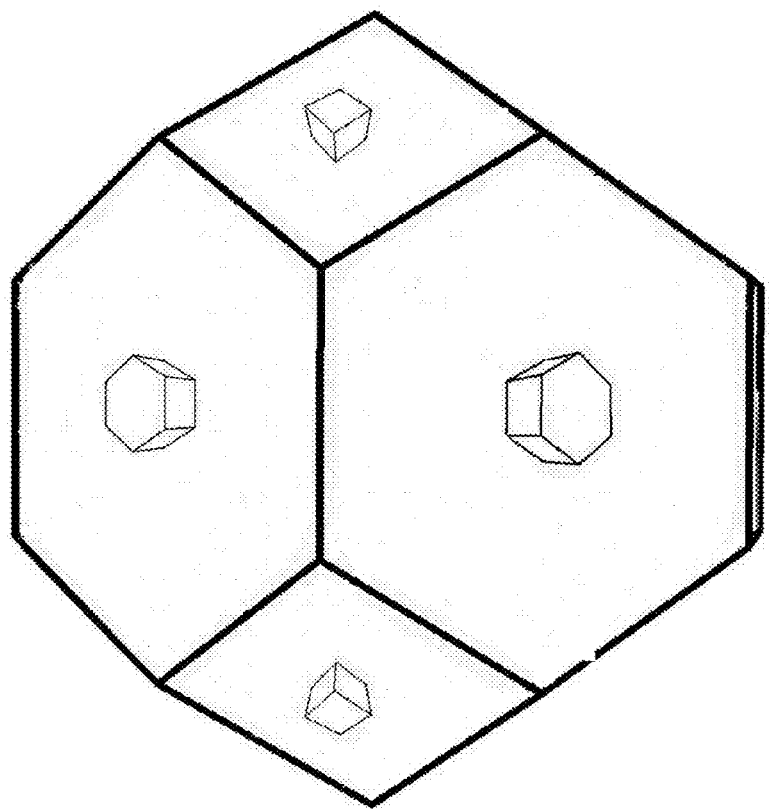
FIG. 8 shows an exemplar microlith based on a truncated octahedron with aplanarities in the form of hexagonal and square prisms on hexagonal and square faces, respectively.

Each sorbent microlith can independently include one or more aplanar features. Each aplanar feature can be independently selected from a convexity and a concavity. An aplanarity can be present on one or more faces of a sorbent microlith, where each aplanarity can be the same or different (e.g., an aplanarity of the same or different convex or concave shape). In certain embodiments, each face of a sorbent microlith includes at least one aplanarity. In certain embodiments, surface aplanarities can have the same symmetry as the underlying space-filling polyhedron. For example, as depicted in FIG. 8, a truncated octahedron can include hexagonal aplanarities on hexagonal faces and square aplanarities on square faces. The aplanar features, when the microliths are arranged in a close-packed array, can create a manifold of free volume.

Suitable aplanarities include convexities, concavities, and combinations thereof. In certain embodiments, the aplanarity is a set of convexities oriented along the symmetry axes of the polyhedral faces or vertices. Non-limiting examples of convexities are hemispheres, disks, polyhedral prisms, spherical caps, cylinders, and arrays thereof. The convex features can prevent intimate contact of opposing polyhedral faces and thereby allow gas to contact the polyhedral surfaces, preferably substantially all of the polyhedral surfaces. In certain embodiments, the aplanarity is a set of concavities oriented along the symmetry axes of the polyhedral faces or vertices. Non-limiting examples of concavities are rectangular, circular, semicircular, or polyhedral channels, spherical caps, inverted dimples, spherical concavities whose radius of curvature is between 0.1 and 10 times the edge length, and corrugations whose wavelength is less than about twice the edge length. The concave features can prevent intimate contact of opposing polyhedral faces and thereby allow gas to contact the polyhedral surfaces, preferably substantially all of the polyhedral surfaces.

The sorbent microliths can be made from a variety of materials. In certain embodiments, each sorbent microlith can independently include one or more materials, each material independently selected from one or more of zeolites, porous glass, porous carbon, metal-organic framework materials, porous polymers, and clay. Suitable sorbent materials for use in the disclosed systems include, but are not limited to, activated carbon, graphite, activated alumina, molecular sieves, aluminophosphate materials, silicoaluminophosphate materials, zeolites, faujasite, clinoptilolite, mordenite, metal-exchanged silico-aluminophosphate, uni-polar resins, bi-polar resins, aromatic cross-linked polystyrenic matrices, brominated aromatic matrices, acrylic polymers, acrylic copolymers, methacrylic polymers, methacrylic copolymers, hydroxyalkyl acrylates, hydroxyalkyl methacrylates, adsorbent carbonaceous materials, adsorbent graphitic materials, carbon fiber materials, nanotubes, nano-materials, adsorbent metal salts (such as perchlorate and oxalate), alkaline earth metal metallic particles, ion exchange resins, linear polymers of glucose, polyacrylamides, or a combination thereof The zeolite may be an ion exchanged metal zeolite, hydrophilic zeolite, hydrophobic zeolite, modified zeolites metal-ion exchanged zeolite, natural X-type zeolite, modified X-type zeolite, A-type zeolite, mordenite-type zeolite, chabazite-type zeolite, ion exchange resin, bioselective sorbent, or a combination thereof.

The sorbent material may include one or more support materials. Suitable supports include, but are not limited to, natural clay, calcined clay, modified clay, chemically treated clay, chemically modified clay, smectite clay, kaolin clay, sub-bentonite clay, kaolin-halloysite clay, kaolin-kaolonite clay, kaolin-nacrite clay, kaolin-anauxite clay, binary matrix material, tertiary matrix material, silica-thoria, silica-alumina, silica-alumina-thoria, silica-alumina-zirconia, fibrous material, colloidal silica material, colloidal alumina material, colloidal zirconia material, colloidal mixture, surface modified amorphous silicon dioxide nanoparticles, hydrated magnesium aluminum silicate, thermoplastic polymer, thermosetting polymer, ferrous support, non-ferrous support, electrically-conductive support, dielectric support, electromagnetic receptor, or a combination thereof. The support may be applied by sintering, pyrolysis, slurrying, vapor deposition, casting, electro-spraying, electrophoretic deposition, extrusion, laser deposition, electron beam deposition, silk screening, photo-lithography deposition, electrostatic self-assembly, high aspect ratio micromachining, LIGA-formation, atomic layer deposition, casting, stamping, or a combination thereof.

The sorbent microliths can be fabricated by a variety of methods. In certain embodiments, microliths can be formed by compression molding of sorbent material into space-filling polyhedra with aplanarities. The molded material may optionally be further processed by pyrolysis or chemical reaction to enhance sorbent porosity, permeability, mechanical strength, thermal conductivity, or other properties as long as the shape and symmetry of the initially molded microliths are retained.

In certain embodiments, the sorbent microliths can be manufactured in a pellet press using tooling configured to produce space filling polyhedral shapes with aplanarities on one or more polyhedral faces. In certain embodiments, the sorbent pellets may be pyrolyzed, activated, or otherwise chemically processed to enhance their storage capacity, adsorption enthalpy, permeability, or porosity while maintaining the geometric shape of a space filling polyhedron with surface aplanarities.

In certain embodiments, the sorbent pellets may have diameters chosen to first pass through the throat or flange of a pressure vessel. The pellets can be configured to self-assemble into an array. For example, the pellets can be configured to self-assemble when agitated into a regular, ordered solid array with prescribed solid and free space configurations; the pellets can be configured to self-assemble when in contact with a template (e.g., a template provided on an inner surface a pressure vessel); or a combination thereof.

In certain embodiments, the sorbent pellets are introduced into a pressure vessel suspended in a liquid whose viscosity and flow profile are chosen to facilitate creation of a regular, ordered solid array. The fluid is then slowly pumped or drained from the vessel to yield a tank with prescribed internal solid and free space configurations.

In certain embodiments, microliths are formed with diameters that are less than the diameter of the aperture through which gas enters and exits the system. These microliths can be added to a pressure vessel constructed by injection molding, machining, welded assembly, composite fiber winding, or other methods. The pressure vessel may optionally be agitated to facilitate self-assembly of an ordered array of microliths with an interpenetrating manifold of interstitial spaces.

c. Exemplary Sorbent Microliths and Microlith Arrays

Figure 1:
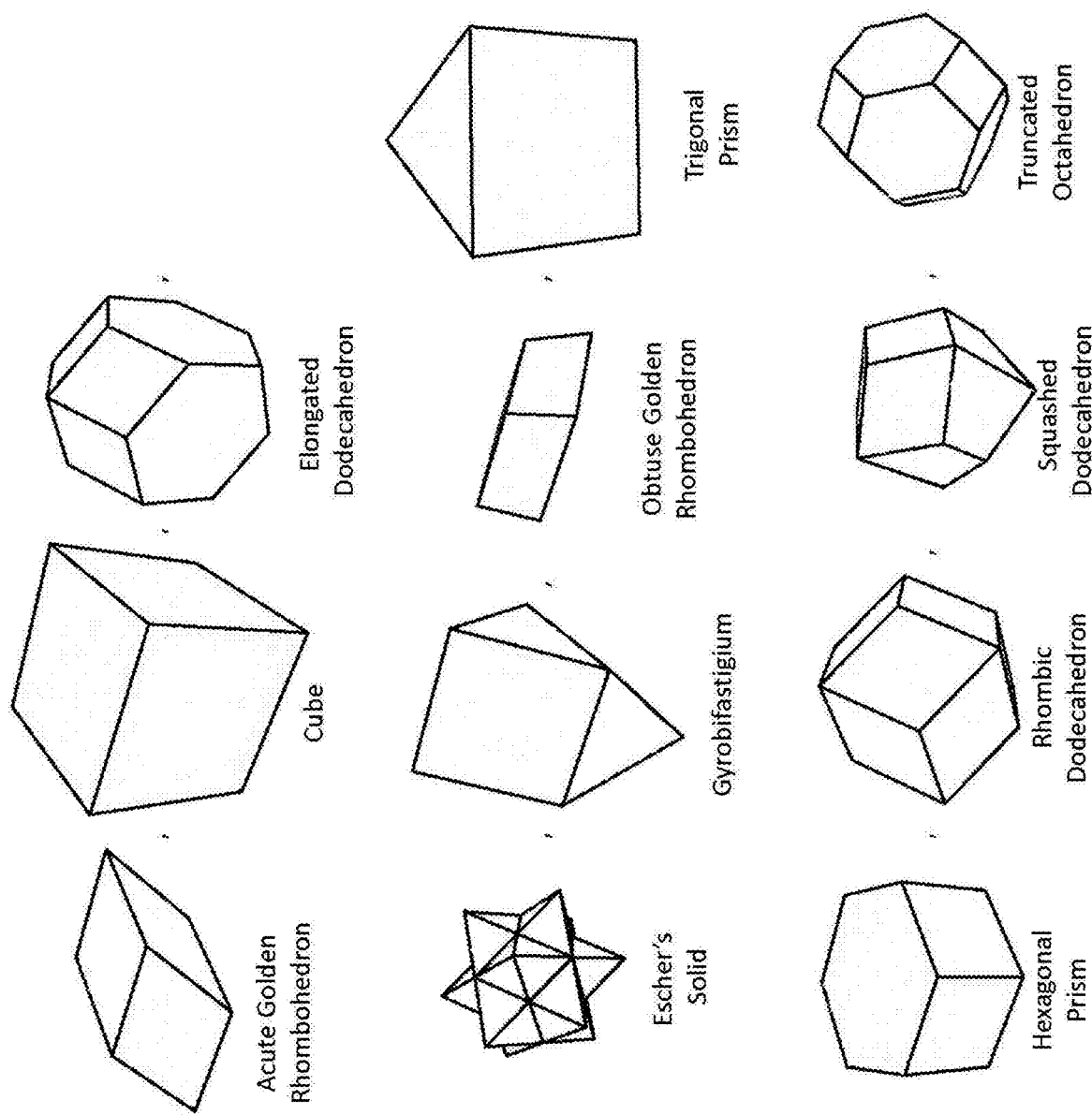
FIG. 1 is a drawing of eleven regular space-filling polyhedra.
Figure 2:
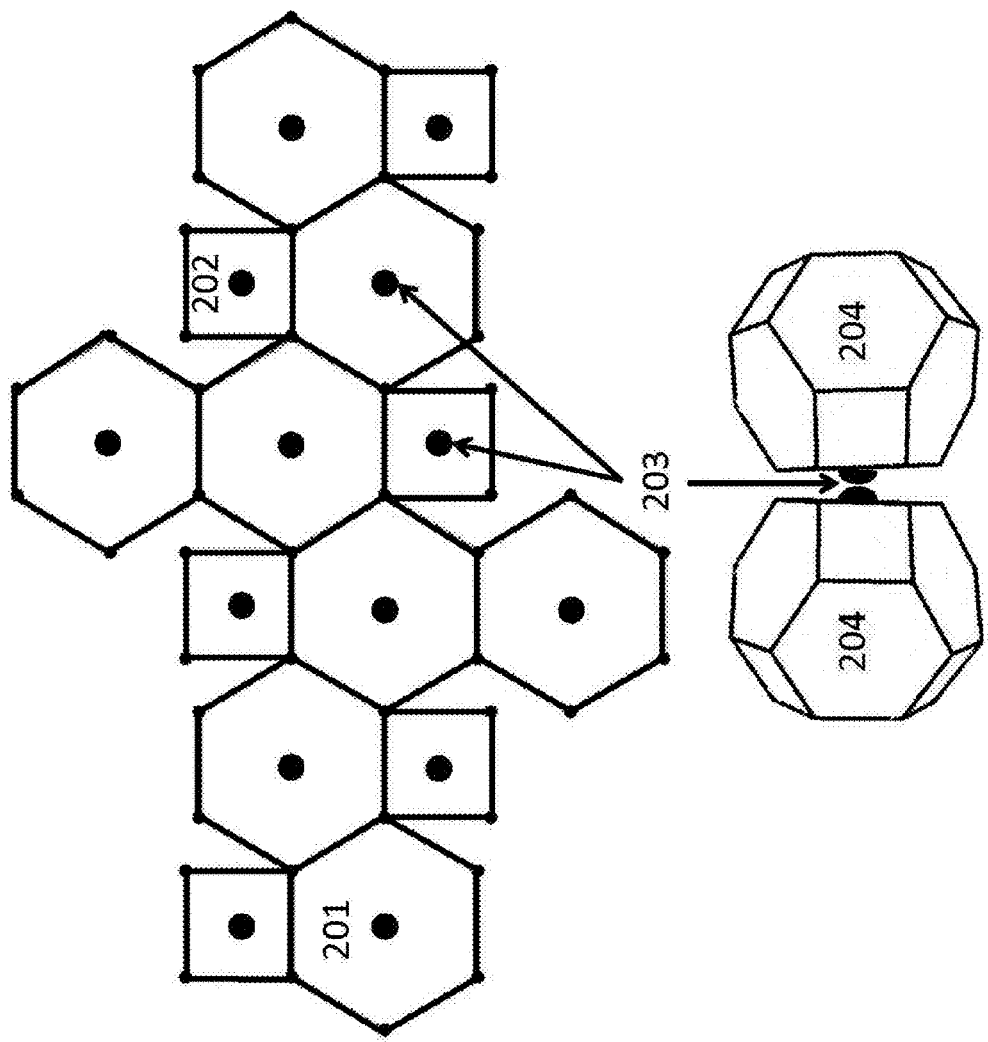
FIG. 2 is a network diagram of a regular truncated octahedron with circular aplanarities centered on each face, and a sketch illustrating how the aplanarities create an interpenetrating, interstitial manifold of free space.
Figure 3:
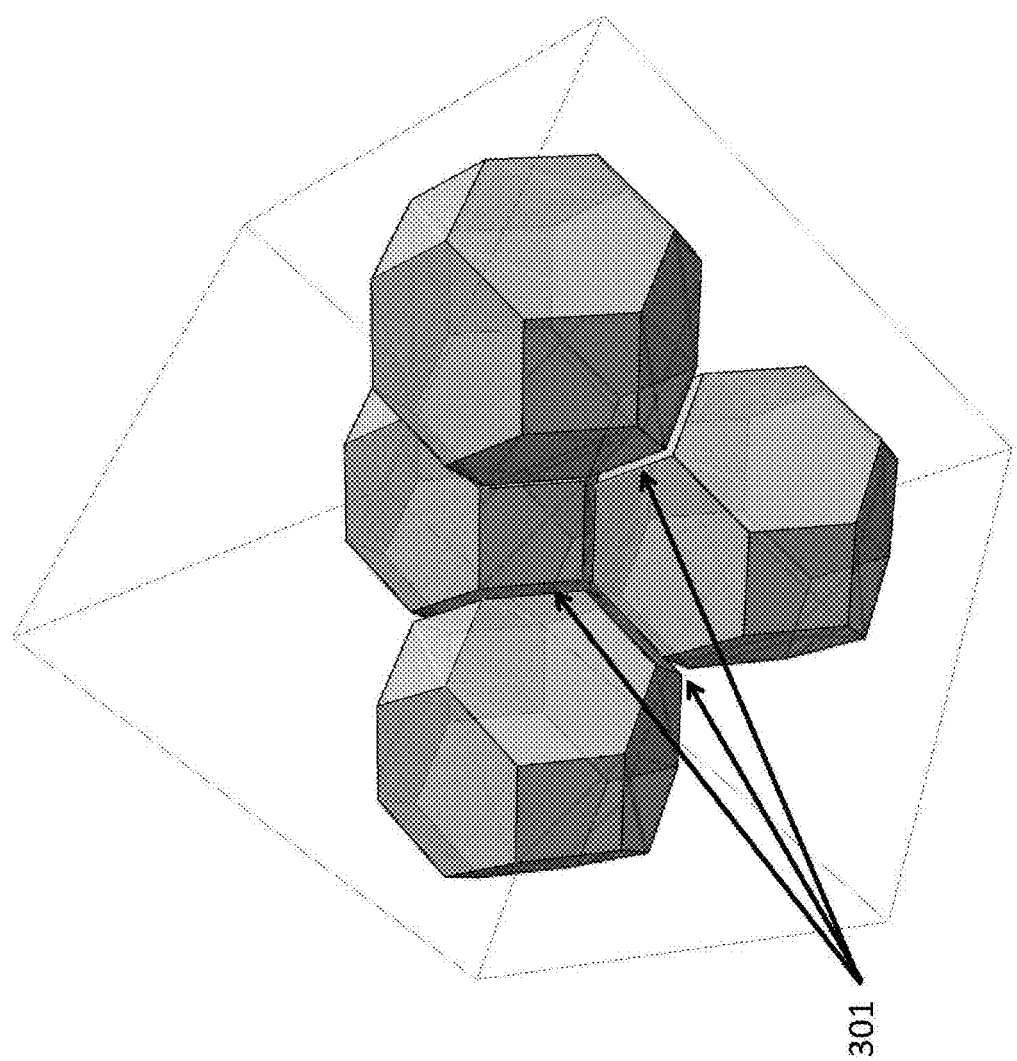
FIG. 3 is a drawing of packed truncated octahedra showing interstices created by displacements induced by contact between surface convexities (not shown).

Referring to FIG. 1, there are eleven regular space-filling polyhedra that completely fill a three dimensional volume. These regular polyhedra have edge lengths (r) that are all the same in the respective polyhedra. Referring to Tables I and II, these polyhedra have surface areas and volumes that are proportional to the edge length (r) squared or cubed, respectively. The surface area to volume ratios, (S/V), are therefore proportional to (1/r). These polyhedra fit together perfectly, so a monolith formed from more than one polyhedron can adsorb or desorb gas only through its exterior surface. In other words, an ordered array of space-filling polyhedral elements would have the same flow characteristics as a monolithic block of the same volume. Introducing an aplanar feature on each polyhedral face, as shown in FIG. 2, produces gaps between the otherwise closely packed faces, thereby exposing each face to a manifold of interconnected, interstitial volume elements through which gas can be conveyed into and out of the sorbent. A space-filling polyhedral sorbent capsule with surface aplanarities is defined herein as a microlith. Referring to FIG. 3, a cutaway view of the manifold produced by convexities on the faces of regular truncated octahedral microliths is shown.

Space filling polyhedra with non-equal edge lengths and surface aplanarities may also be used as microliths according to the present disclosure. The reduced symmetry of these irregular space-filling polyhedra may complicate fabrication of a close-packed array. However, irregular shapes may be advantageous in terms of their manufacture, heat transfer, or mechanical properties that offset this complexity.

An example of a microlith according to the present disclosure is shown in FIG. 2. The regular truncated octahedron has fourteen faces, eight hexagons (201) and six squares (202), displayed as a connected net graph. At the center of each face and retaining the octahedral symmetry of the polyhedron, protuberances in the form of small spherical caps (203) impede full contact of the faces in a close-packed array of microliths. This configuration generates an internal manifold of gaps that provides fluid access to the opposing faces. Referring to FIG. 3, four truncated octahedra in an ordered array are shown in a cutaway view from a larger array to indicate the interstitial manifold (301) that is produced by the aplanarity (not shown) of the polyhedral faces. In certain embodiments, the convex protuberances (203) may be in the form of spherical caps, cylinders, polyhedral prisms, or arrays thereof that prevent intimate contact of opposing polyhedral faces and thereby allow gas to contact substantially all of the polyhedral surfaces. In certain embodiments, the aplanarities that prevent intimate contact are concave features that allow gas contact to substantially all of the polyhedral surfaces. Non-limiting examples of concave features include rectangular, circular, or polyhedral channels, spherical concavities whose radius of curvature is between 0.1 and 10 times the edge length, and corrugations whose wavelength is less than about twice the edge length.

Figure 9:
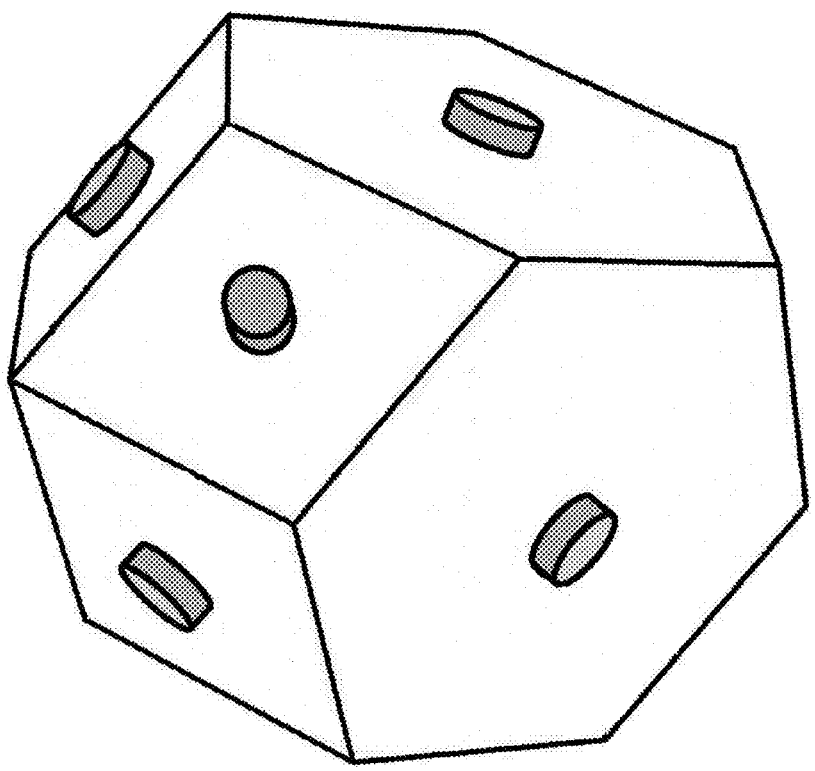
FIG. 9 shows an exemplar microlith based on an elongated dodecahedron with cylindrical prismatic convexities centered on each face.
Figure 10:
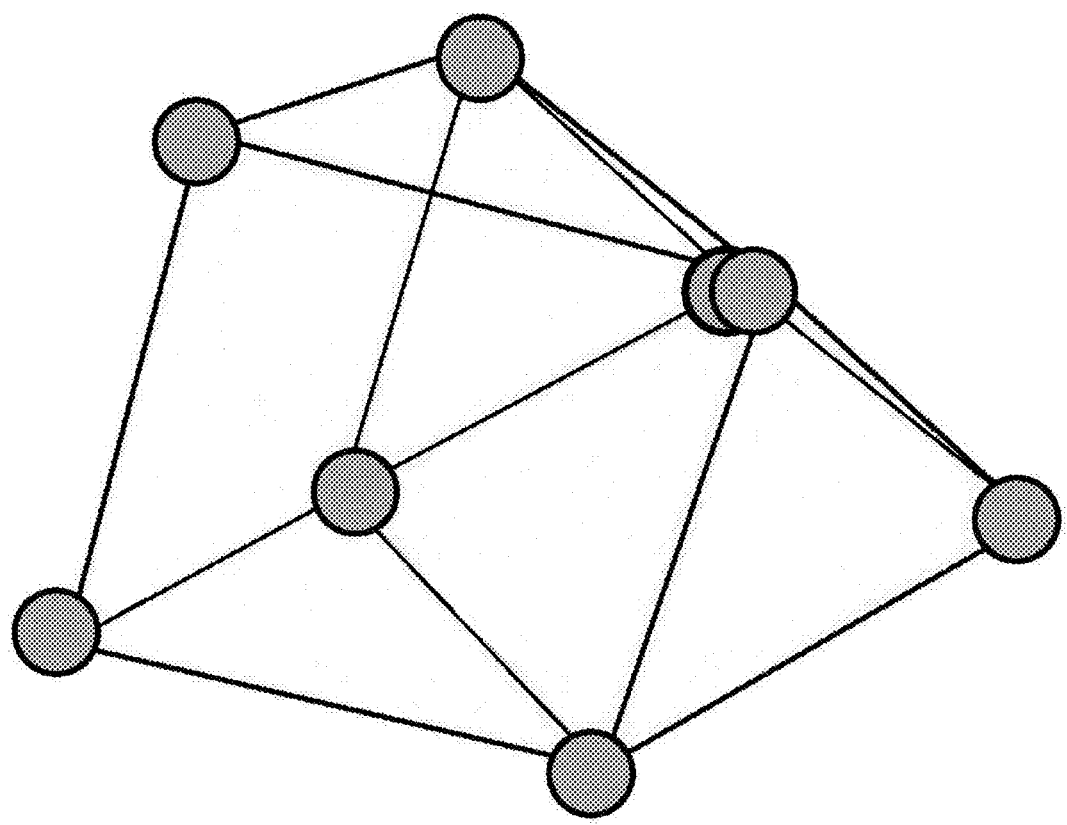
FIG. 10 shows an exemplar microlith based on spherical convexities oriented at the vertices of a gyrobifastigium.

In certain embodiments, surface aplanarities have the same symmetry as the underlying space-filling polyhedron. Referring to FIG. 8, one example of symmetrically disposed convex features is hexagonal prisms centered on the hexagonal faces and square prisms centered on the square faces of the truncated octahedron. All of the symmetry planes and axes of the polyhedron are retained following addition of the aplanarities that generate packing gaps. Another example of symmetrically disposed aplanarities, cylindrical convexities with circular faces centered on the hexagonal and rhombohedral faces of an elongated dodecahedron, is shown in FIG. 9. Yet another example, shown in FIG. 10, entails spherical balls appended at each vertex of a gyrobifastigium whose radius is one-half of the required gap.

d. Pressure Vessels/Envelopes

Suitable pressure vessels or envelopes for use in the disclosed systems include, but are not limited to, metallic, polymeric, or composite barriers and vessels. The vessels and evelopes may have a shape designed to accommodate space constraints in a vehicle, generator, or other system requiring compressed gas for its operation. Metallic tanks may be fabricated from aluminum, steel, titanium, or other alloys. Polymeric tanks may be fabricated by, for example, reaction injection molding of poly-dicyclopentadiene. Examples of composite tanks can be fabricated from epoxy and carbon or glass fibers. In certain embodiments, the pressure vessel is formed from an epoxy-impregnated carbon fiber blanket, preferably including a fitting that allows independent introduction of a gas. In certain embodiments, the pressure vessel is an aluminum or titanium vessel. In certain embodiments, the pressure vessel is formed with polydicyclopentadiene by reaction injection molding and a ring-opening metathesis polymerization.

In certain embodiments, the pressure vessel has an interior surface whose texture provides an internal template to facilitate self-assembly of the ordered array of microliths. For example, an interior surface comprised of square pyramids whose edge length equals that of a cubic microlith.

e. Apertures

The disclosed systems include one or more apertures through which gas may enter (at elevated pressures) or exit (at reduced pressure) a pressure vessel or envelope. Suitable aperture types for use in the disclosed systems include, but not limited to, ports, flanges, or tubes in fluid communication with the interstitial manifold of free spaces.

f. Valves

The disclosed systems can include one or more valves connected to the apertures through which gas may enter (at elevated pressures) or exit (at reduced pressure) the pressure vessel or envelope. Suitable valve(s) for use in the disclosed systems include, but not limited to, bonnet valves, gate valves, check valves, Tesla valves, and diode valves, any which may be operated manually or through electromechanical, solenoidal, pneumatic, or hydraulic mechanisms.

g. Gases

Suitable gases for use in the disclosed systems include, but are not limited to, hydrocarbon gases (e.g., natural gas), methane, hydrogen, dichlorosilane, hydrogen chloride, sulfur dioxide, and industrial gases that decompose above room temperature. Examples of thermally unstable gases that may used in the disclosed systems include, but are not limited to, $NH_3$, $Cl_2$, $SiH_2Cl_2$, HBr, $NO_2$, and $SO_2$. In certain embodiments, the gas is a combustible material containing one or more hydrogen atoms. In certain embodiments, the gas is a mixture whose components have different affinities for the sorbent to facilitate separation of the mixture. In certain embodiments, the gas has an enthalpy of adsorption sufficient for the material to serve as a refrigerant.

3. Methods of Use

In another aspect, disclosed are methods of storing, pumping, or purifying one or more gases. The methods can employ a system as disclosed herein. Gases, sorbent materials, and system requirements for flow rates into and out of the sorbent material can be selected based on desired flow and storage parameters. Flows through the manifold and solid sorbent can be calculated as a function of the polyhedral edge lengths and the shape and dimensions of the aplanarities using finite element calculations familiar to those practiced in the art of computational fluid dynamics. For any combination of polyhedron and aplanarity, the flow rate through the manifold increases with the aplanarity dimensions and manifold volume until porous convective flow into the manifold from the sorbent is matched by free convective flow through the manifold to the aperture(s) of the system. This dimension identifies the optimum condition for the system, since further increase of the manifold volume reduces the packing density without changing the flow rate of gas into or out of the system.

4. Exemplary Embodiments

For reasons of completeness, various aspects of the disclosure are set out in the following numbered clauses:

Clause 1. A space-filling polyhedral-shaped sorbent microlith comprising one or more aplanarities on one or more polygonal faces.

Clause 2. The sorbent microlith of clause 1, wherein the sorbent microlith comprises one or more of zeolites, porous glass, porous carbon, metal-organic framework materials, microporous polymers, and clay.

Clause 3. The sorbent microlith of clause 1 or clause 2, wherein the sorbent microlith has the shape of a regular polyhedron.

Clause 4. The sorbent microlith of clause 3, wherein the sorbent microlith has the shape of an acute golden rhombohedron, a cube, an elongated dodecahedron, an Escher's solid, a gyrobifastigium, an obtuse golden rhombohedron, a trigonal prism, a hexagonal prism, a rhombic dodecahedron, a squashed dodecahedron, or a truncated octahedron.

Clause 5. The sorbent microlith of any one of clauses 1-3, wherein the sorbent microlith has the shape of an irregular polyhedron.

Clause 6. The sorbent microlith of clause 5, wherein the sorbent microlith has the shape of an elongated or squashed hexagonal or trigonal prism, a rectangular parallelopiped, or a polyhedra formed by stretching or shearing a regular space-filling polyhedron.

Clause 7. The sorbent microlith of any one of clauses 1-6, wherein the aplanarities are convexities.

Clause 8. The sorbent microlith of clause 7, wherein the convexities are hemispheres, disks, polyhedral prisms, or spherical caps.

Clause 9. The sorbent microlith of any one of clauses 1-6, wherein the aplanarities are concavities.

Clause 10. The sorbent microlith of clause 9, wherein the concavities are rectangular, semicircular, or polygonal channels, spherical caps, or inverted dimples.

Clause 11. The sorbent microlith of any one of clauses 1-10, wherein the edge length of the microlith ranges from 1 to 100 millimeters.

Clause 12. An array of space-filling polyhedral-shaped sorbent microliths, wherein at least one of the microliths comprises one or more aplanarities on one or more polygonal faces.

Clause 13. The array of clause 12, wherein the array comprises an interpenetrating, interstitial manifold of free space (e.g., through which gas may flow).

Clause 14. The array of clause 12 or clause 13, wherein the sorbent microliths comprise one or more of zeolites, porous glass, porous carbon, metal-organic framework materials, microporous polymers, and clay.

Clause 15. The array of any one of clauses 12-14, wherein the sorbent microliths have the shape of a regular polyhedron.

Clause 16. The array of clause 15, wherein the sorbent microliths have the shape of an acute golden rhombohedron, a cube, an elongated dodecahedron, an Escher's solid, a gyrobifastigium, an obtuse golden rhombohedron, a trigonal prism, a hexagonal prism, a rhombic dodecahedron, a squashed dodecahedron, or a truncated octahedron.

Clause 17. The array of any one of clauses 12-14, wherein the sorbent microliths have the shape of an irregular polyhedron.

Clause 18. The array of clause 17, wherein the sorbent microliths have the shape of an elongated or squashed hexagonal or trigonal prism, a rectangular parallelopiped, or a polyhedra formed by stretching or shearing a regular space-filling polyhedron.

Clause 19. The array of any one of clauses 12-18, wherein the aplanarities are convexities.

Clause 20. The array of clause 19, wherein the convexities are hemispheres, disks, polyhedral prisms, or spherical caps.

Clause 21. The array of any one of clauses 12-18, wherein the aplanarities are concavities.

Clause 22. The array of clause 21, wherein the concavities are rectangular, semicircular, or polygonal channels, spherical caps, or inverted dimples.

Clause 23. The array of any one of clauses 12-22, wherein the edge length of the sorbent microliths ranges from one to one hundred millimeters.

Clause 24. A system for storing, pumping, or purifying a gas, comprising: a sorbent microlith according to any one of clauses 1-11 or an array according to any one of clauses 12-23; a vessel; one or more apertures through which gas may enter or exit the vessel; and one or more valves connected to the apertures [e.g., through which gas may enter (at elevated pressures) or exit (at reduced pressure) the vessel].

Clause 25. The system of clause 24, wherein the diameter of the sorbent microliths is smaller than one aperture (e.g., so that sorbent can be added to a pre-fabricated pressure vessel and jostled to produce an ordered array).

Clause 26. The system of clause 24 or clause 25, wherein the gas is hydrogen or a hydrocarbon fuel.

Clause 27. The system of any one of clauses 24-26, wherein the gas is a mixture of more than one molecular component that have different sorption properties on the sorbent (e.g., allowing separation of the mixture's components).

Clause 28. The system of clause 24 or clause 25, wherein the gas has a non-zero enthalpy of adsorption on the sorbent (e.g., that allows the system to act as a heat pump when the gas is added to or removed from the sorbent).

Clause 29. The system of clause 24 or clause 25, wherein the gas is a refrigerant characterized by a non-zero enthalpy of adsorption (e.g., so that heat transfer rates and capacities are proportional to the flow rates and packing densities provided according to the method).

Clause 30. The system of any one of clauses 24-29, wherein the vessel is a pressure vessel or envelope.

Clause 31. The system of any one of clauses 24-30, wherein the vessel has an interior template to facilitate self-assembly of the array from the sorbent microliths.

Clause 32. A method for storing, pumping, or purifying a gas, comprising transferring a gas to or from a vessel comprising a sorbent microlith according to any one of clauses 1-11 or an array according to any one of clauses 12-23, or the vessel of a system according to any one of clauses 24-31.

Clause 33. A method of manufacturing a system according to any one of clauses 24-31, the method comprising: (1) placing the sorbent microliths through the aperture of the vessel; and (2) agitating the vessel to induce self-assembly of the microliths into a close-packed array with an interpenetrating, interstitial manifold of free space.

Clause 34. A method of manufacturing a system according to any one of clauses 24-31, the method comprising: (1) arranging sorbent microliths into a close-packed array with an interpenetrating, interstitial manifold of free space; and (2) forming the vessel with one or more apertures around said array.

Clause 35. The method of clause 33 or clause 34, wherein the vessel is fabricated from one or more of metal, injection-molded polymer, or epoxy-fiber composite winding.

Clause 36. The method of clause 33, wherein the sorbent microliths are suspended in a fluid whose viscosity and density facilitate orientation and self assembly of the close-packed array.

Clause 37. The method of clause 34, wherein the sorbent microliths are wrapped in an optionally sacrificial polymeric film that permits subsequent injection molding or forming steps to occur without infiltration of the interstitial manifold.

Clause 38. The method of clause 37, wherein the wrapping material is sacrificial and may be removed by chemical reaction, pyrolysis, sublimation, or the like following fabrication of the pressure vessel.

Clause 39. The sorbent microlith of any one of clauses 1-11, the array of any one of clauses 12-23, the system of any one of clauses 24-31, or a method of any one of clauses 32-38, where the modulation depth of the aplanarity is chosen to balance porous convection rates through the sorbent material to free convection rates through the interstitial manifold, resulting in maximal capacity subject to constraints on achievable flow rates.

While the present invention is described in connection with what is presently considered to be the most practical and preferred embodiments, it should be appreciated that the invention is not limited to the disclosed embodiments, and is intended to cover various modifications and equivalent arrangements included within the spirit and scope of the claims. Modifications and variations in the present invention may be made without departing from the novel aspects of the invention as defined in the claims. The appended claims should be construed broadly and in a manner consistent with the spirit and the scope of the invention herein.

TABLE I

Surface area and volume of regular polyhedra in terms of their edge length, r.

| Polyhedron | Surface Area (times $r^2$) | Volume (times $r^3$) | $\frac{\text{Surface Area}}{\text{Volume}}$ (times $\frac{1}{r}$) |
|---|---|---|---|
| Acute Golden Rhombohedron | $\frac{1}{5}\sqrt{2(5+\sqrt{5})}$ | $\frac{12}{\sqrt{5}}$ | $6\sqrt{\frac{10}{5+\sqrt{5}}}$ |
| Cube | 1 | 6 | 6 |
| Elongated Dodecahedron | 6 | $2\sqrt{3}(3+\sqrt{5})$ | $\frac{3+\sqrt{5}}{\sqrt{3}}$ |
| Escher's Solid | $\frac{32}{3\sqrt{3}}$ | $16\sqrt{2}$ | $3\sqrt{\frac{3}{2}}$ |
| Gyrobifastigium | $\frac{\sqrt{3}}{2}$ | $4+\sqrt{3}$ | $\frac{2(4+\sqrt{3})}{\sqrt{3}}$ |
| Obtuse Golden Rhombohedron | $\frac{1}{5}\sqrt{10-2\sqrt{5}}$,, | $\frac{12}{\sqrt{5}}$ | $12\sqrt{\frac{5}{10-2\sqrt{5}}}$ |
| Trigonal Prism | $\frac{\sqrt{3}}{4}$ | $\frac{1}{2}(6+\sqrt{3})$ | $\frac{2(6+\sqrt{3})}{\sqrt{3}}$ |
| Hexagonal Prism | $\frac{3\sqrt{3}}{2}$ | $3(2+\sqrt{3})$ | $\frac{2(2+\sqrt{3})}{\sqrt{3}}$ |
| Rhombic Dodecahedron | $\frac{16}{3\sqrt{3}}$ | $8\sqrt{2}$ | $3\sqrt{\frac{3}{2}}$ |
| Squashed Dodecahedron | $6\sqrt{3}$ | $18\sqrt{2}$ | $\sqrt{6}$ |
| Truncated Octahedron | $8\sqrt{2}$ | $6+12\sqrt{3}$ | $\frac{6+12\sqrt{3}}{8\sqrt{2}}$ |

TABLE II

Approximate numerical values of surface area (~$r^2$), volume (~$r^3$), sorted in order of increasing S/V ratio (~$1/r$)

| Polyhedron | Surface Area | Volume | S/V |
|---|---|---|---|
| Truncated Octahedron | 11.31 | 26.78 | 2.37 |
| Squashed Dodecahedron | 10.39 | 25.46 | 2.45 |
| Elongated Dodecahedron | 6.00 | 18.14 | 3.02 |
| Escher Solid | 6.16 | 22.63 | 3.67 |
| Rhombic Dodecahedron | 3.08 | 11.31 | 3.67 |
| Hexagonal Prism | 2.60 | 11.20 | 4.31 |
| Cube | 1.00 | 6.00 | 6.00 |
| Gyrobifastigium | 0.87 | 5.73 | 6.62 |
| Acute Golden Rhombohedron | 0.76 | 5.37 | 7.05 |
| Trigonal Prism | 0.43 | 3.87 | 8.93 |
| Obtuse Golden Rhombohedron | 0.47 | 5.37 | 11.41 |

What is claimed is:

1. An array of space-filling polyhedral-shaped sorbent microliths, wherein at least one of the microliths comprises one or more aplanarities on one or more polygonal faces, wherein the array comprises an interpenetrating, interstitial manifold of free space.

2. The array of claim 1, wherein the sorbent microliths comprise one or more of zeolites, porous glass, porous carbon, metal-organic framework materials, microporous polymers, and clay.

3. The array of claim 1, wherein the sorbent microliths have the shape of a regular polyhedron.

4. The array of claim 1, wherein the sorbent microliths have the shape of an acute golden rhombohedron, a cube, an elongated dodecahedron, an Escher's solid, a gyrobifastigium, an obtuse golden rhombohedron, a trigonal prism, a hexagonal prism, a rhombic dodecahedron, a squashed dodecahedron, or a truncated octahedron.

5. The array of claim 1, wherein the sorbent microliths have the shape of an irregular polyhedron.

6. The array of claim 1, wherein the sorbent microliths have the shape of an elongated or squashed hexagonal or trigonal prism, a rectangular parallelopiped, or polyhedra formed by stretching or shearing a regular space-filling polyhedron.

7. The array of claim 1, wherein the aplanarities are convexities.

8. The array of claim 7, wherein the convexities are hemispheres, disks, polyhedral prisms, or spherical caps.

9. The array of claim 1, wherein the aplanarities are concavities.

10. The array of claim 9, wherein the concavities are rectangular, semicircular, or polygonal channels, spherical caps, or inverted dimples.

11. The array of claim 1, wherein the edge lengths of the sorbent microliths ranges from one to one hundred millimeters.

12. A system for storing, pumping, or purifying a gas, comprising:
    an array according to claim 1;
    a pressure vessel or envelope;
    one or more apertures through which gas may enter or exit the vessel; and
    one or more valves connected to the apertures.

13. The system of claim 12, wherein the diameter of the sorbent microliths is smaller than one aperture.

14. The system of claim 12, wherein the gas is hydrogen or a hydrocarbon fuel.

15. The system of claim 12, wherein the gas is a mixture of more than one molecular component that have different sorption properties on the sorbent.

16. The system of claim 12, wherein the gas is a refrigerant characterized by a non-zero enthalpy of adsorption.

17. The system of claim 12, wherein the vessel has an interior template to facilitate self-assembly of the array from the sorbent microliths.

18. A method of manufacturing a system according to 12, the method comprising:
    (1) placing sorbent microliths through the aperture of the vessel; and
    (2) agitating the vessel to induce self-assembly of the microliths into a close-packed array with an interpenetrating, interstitial manifold of free space.

19. A method of manufacturing a system according to claim 12, the method comprising:
    (1) arranging sorbent microliths into a close-packed array with an interpenetrating, interstitial manifold of free space; and
    (2) forming the vessel with one or more apertures around said array.

20. The method of claim 19, wherein the vessel is fabricated from one or more of metal, injection-molded polymer, or epoxy-fiber composite winding.

* * * * *